Figure 1:
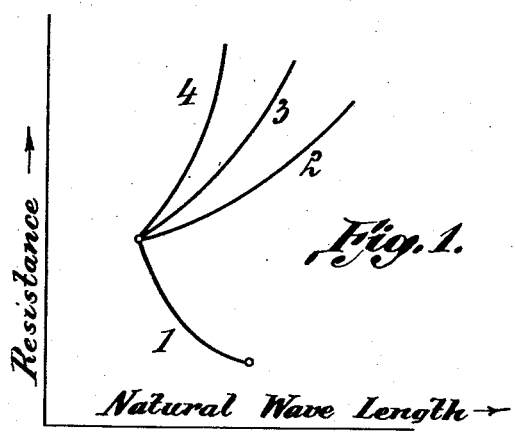

June 21, 1932.   H. LÖWY   1,864,024
METHOD OF EXPLORING GROUND
Filed March 9, 1928   2 Sheets-Sheet 1

Inventor
H. Löwy

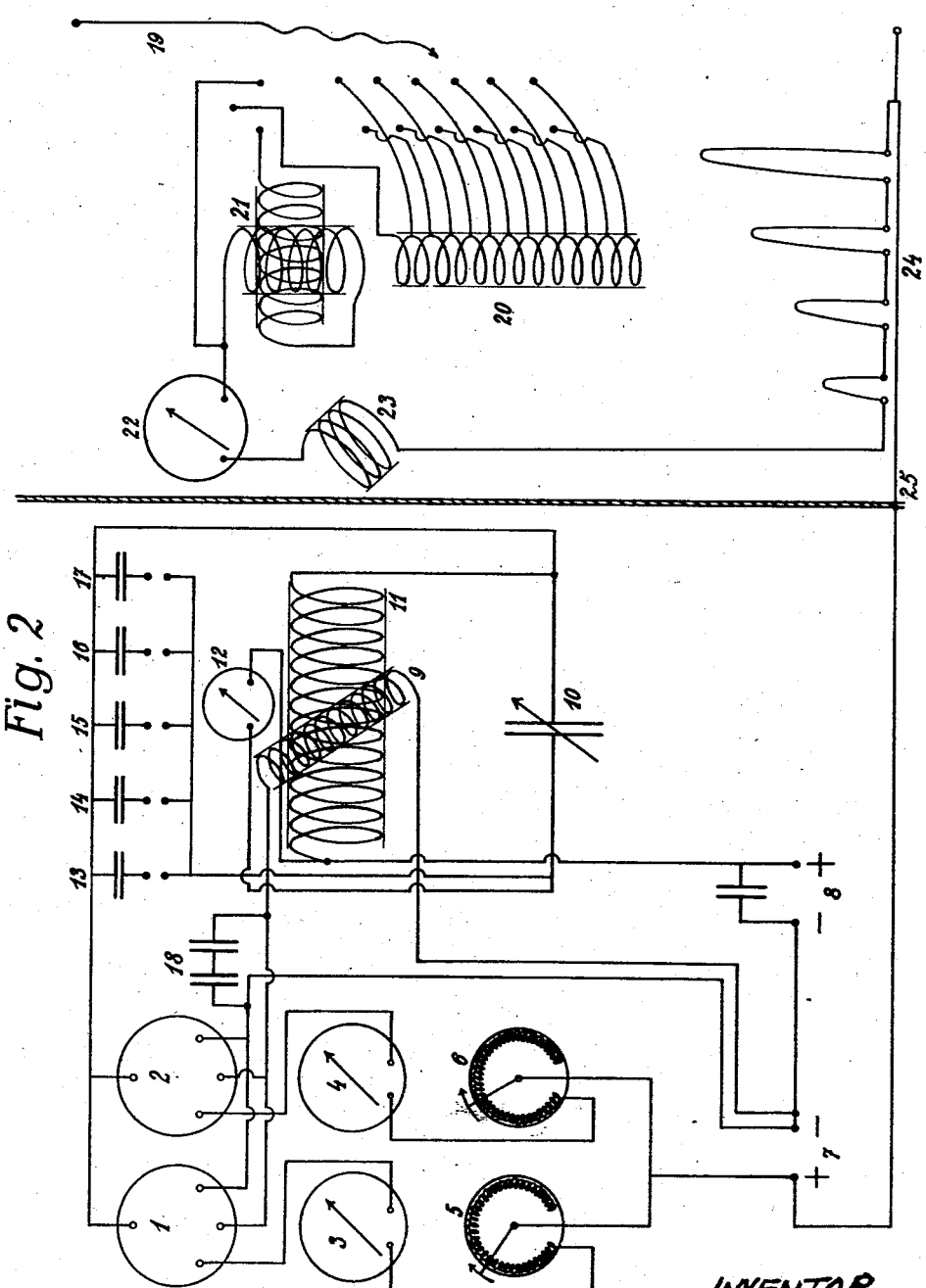

Patented June 21, 1932

1,864,024

UNITED STATES PATENT OFFICE

HEINRICH LÖWY, OF VIENNA, AUSTRIA

METHOD OF EXPLORING GROUND

Application filed March 9, 1928, Serial No. 260,395, and in Austria March 12, 1927.

My invention relates to an improved method of exploring the ground for determining therein the existence, the depth below the ground and with some restrictions hereinafter more fully referred to also the nature of strata below the surface of the ground differing in electric properties from the surface.

I have found that the frequency or the natural wave length of electric oscillations produced in an overground high frequency oscillation circuit depends not only on the constants of such circuit such as ohmic resistance, self induction and capacity, but also on the distance of such circuit from bodies more particularly if the latter are conductors of electricity but that this natural wave length is practically independent of the nature of such bodies. On the other hand it is well known that the damping constant and the oscillation amplitude of such circuit, if within the field of action of conductive or nonconductive bodies depends not only on the distance of such circuit from the said conductive bodies but also on their nature, that is to say of constants of the said bodies and more particularly the conductivity and dielectricity constant of the said bodies.

I have further found that if the natural wave lengths and the damping constants or oscillation amplitudes of an oscillation circuit located in the field of action of other bodies more particularly conductive ones are plotted as abscissæ and as ordinates respectively I obtain a practically well defined curve which, however varies with the nature of the said body. Thus in Fig. 1 I have shown such curves for a few main classes of bodies; curve 1 is for oil always accompanied by water, curve 2 is for sweet water, curve 3 is for salt water and curve 4 is for ore. All these curves diverge without intersecting each other from one point corresponding to infinitely great distance. Such curves might in some cases be determined theoretically but a far more reliable method is to determine them empirically.

Assuming now land having a dry nonconductive surface such as a desert has to be explored for ascertaining whether there are subterranean strata of sweet or salt water, ore or oil I proceed as follows:

I mount on some points of the land to be explored an oscillation circuit producing oscillations of a given natural frequency or wave length and a given damping constant or oscillation amplitude on some point of the land to be explored. I then determine the natural wave length and damping constant or oscillation amplitude of the circuit so mounted. I then mark the values of the wave length thus found on the abscissa axis and the damping constant or the oscillation amplitude on the ordinates axis. If then the point of intersection of the ordinate of the former and the abscissa of the latter point falls into or into close proximity to one of the lines of Fig. 1 say the line 2 then this clearly indicates that there is a layer of sweet water, below the point of observation.

Instead of using a graph, such as shown in the annexed drawing I may obviously also use a table the horizontal head line giving the various natural wave lengths and the left vertical line giving the damping constants or the oscillation amplitudes of the waves produced by the given circuit but for the present I find a graph more suitable for my purpose. The natural wave length being practically a function solely of the distance between the oscillation circuit and the conductive layer I may number the abscissæ by wave lengths and by distances simultaneously. Thus it will be seen that by my method I determine by two simple and reliable observations and my graph or table, not only the depth of the layer below the surface of the ground but also the nature of such layer.

By repeating these observations at various points of the land to be explored I am able to readily determine the horizontal extent of the layers and of their nature.

One of the conditions under which my method is generally applicable is that the strata or layers are substantially horizontal. If this be not the case the indications become more or less uncertain. Furthermore I can determine by my method only the uppermost conductive layer but not any layers below the uppermost one, because this latter acts as a shield preventing the reaction of the deeper layers on the circuits. Therefore my method is in general not applicable in lands, where the surface contains moisture to an extent to make it conductive but only in lands having a dry surface such as deserts.

I prefer to use an oscillation circuit comprising a substantially horizontal antenna, laid out on the dry ground, but I may also secure my oscillation circuit to poles or use existing telegraph or telephone lines. Or I may mount my oscillation circuit on air crafts which must of course fly as nearly as possible in a horizontal plane.

Fig. 2 shows a diagram of an apparatus which in practice has been found suitable for the purposes of the invention. The parts 1 to 18 show an electric oscillation circuit in which oscillations are set up by an electron valve back-coupling transmitter, parts 19 to 24 indicate the antenna circuit, and 25 is a metallic partition (Faraday case) between the transmitter and antenna circuits. In this Figure, 1 and 2 are electronic valves, 3 and 4 are ammeters for measuring the heating current, and 5 and 6 are adjustable condensers. The numeral 7 indicates the position of the battery for the heating current, 8 indicates the position of the anode battery, and, 9 is the back-coupling coil between the grid and the cathode. The numeral 10 indicates an adjustable condenser in the closed oscillation circuit, and 11 is a self induction coil in such circuit, 12 being an alternate current ammeter. 13, 14, 15, 16 and 17 are condensers of constant capacity arranged in parallel to the adjustable condenser. The numeral 18 indicates condensers of constant capacity between the grid and the cathode; 19 is the antenna, and 20 is a tapped self-induction coil. 21 is a self induction variometer or a structure of adjustable self induction, 22 is a thermogalvanometer preferably of the Weston type, 23 is a coil for coupling the antenna circuit with the closed transmitter circuit, 24 are constant ohmic resistances free from self-induction, and 25 are the metallic partitions between the two oscillation circuits.

The natural wave length set up in the antenna circuit (19—24) is determined by adjusting the adjustable condenser 10 of the transmitter circuit until the thermo-galvanometer 22 of the antenna circuit shows a maximum value of the current passing therethrough in which case the two circuits are in resonance. Then the frequency in the antenna circuit is the same as that set up in the closed transmitter circuit and indicated by the pointer of the adjustable condenser 10. This frequency is also the natural frequency of the antenna circuit as affected by the presence and nature of the subterranean strata to be explored. Then the total resistance of the antenna circuit is determined by the well known resistance substitution method with the aid of the ohmic resistance 24. From this total resistance thus determined and from the natural frequency of the antenna circuit given by the pointer of the adjustable condenser 10 of the transmitter, I find by means of records such as the graph shown in Fig. 1 not only the nature but also the depth of the strata to be explored as above set forth.

What I claim is:

1. A method for determining the existence, the depth below the ground and the nature of strata, differing in electric properties from the surface, consisting in determining the natural wave length and the damping resistance of an overground high frequency oscillation circuit of given constants at a point of the ground to be explored, comparing the results thus obtained with a graph showing curves derived from known layers of different nature by marking the said found natural wave length and damping resistance as abscissæ and ordinates, on the said graph, the curve of the said graph into which falls the point having the said abscissæ and ordinates determining the nature of the said layer, its depth below the ground being indicated by the said wave length.

2. A method determining the existence, the depth below the ground and the nature of strata, differing in electric properties from the surface, consisting in determining the natural wave length and the damping resistance of an overground high frequency oscillation circuit of given constants at a point of the ground to be explored, comparing the results thus obtained with a graph showing curves derived from known layers of different nature by marking the said found natural wave length and damping resistance as abscissæ and ordinates on the said graph, the curve of the said graph into which falls the point having the said abscissæ and ordinates determining the nature of the said layer, its depth below the ground being indicated by the said wave length, and repeating the said procedure at different points of the ground to be explored.

In testimony whereof he affixed his signature.

HEINRICH LÖWY.